(12) United States Patent
Hu et al.

(10) Patent No.: US 11,958,149 B2
(45) Date of Patent: Apr. 16, 2024

(54) FASTENING TOOL, A BOLT ASSEMBLING DEVICE AND A METHOD FOR ASSEMBLING A HIGH PRESSURE COMPRESSOR ROTOR

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Yiting Hu, Shanghai (CN); Wenxing Mu, Shanghai (CN); Fei Pan, Shanghai (CN); Yuqian Zhou, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 0 days.

(21) Appl. No.: 18/246,053

(22) PCT Filed: Jul. 9, 2021

(86) PCT No.: PCT/CN2021/105544
§ 371 (c)(1),
(2) Date: Mar. 21, 2023

(87) PCT Pub. No.: WO2022/057411
PCT Pub. Date: Mar. 24, 2022

(65) Prior Publication Data
US 2023/0356337 A1    Nov. 9, 2023

(30) Foreign Application Priority Data

Sep. 21, 2020   (CN) .......................... 202010991798.6

(51) Int. Cl.
*B23P 21/00*   (2006.01)
*B23P 19/06*   (2006.01)

(52) U.S. Cl.
CPC ............. *B23P 21/004* (2013.01); *B23P 19/06* (2013.01)

(58) Field of Classification Search
CPC ......... Y10T 29/49899; Y10T 29/49902; Y10T 29/49895; B23P 19/10; B23P 19/12; B23P 19/06
See application file for complete search history.

(56) References Cited

FOREIGN PATENT DOCUMENTS

| CN | 204546338 U | 8/2015 |
|---|---|---|
| CN | 105127789 A | 12/2015 |

(Continued)

OTHER PUBLICATIONS

International Search Report and Written Opinion dated Aug. 30, 2021, in corresponding International Application No. PCT/CN2021/105544, 15 pages.

*Primary Examiner* — Jason L Vaughan
(74) *Attorney, Agent, or Firm* — Maier & Maier, PLLC (57) ABSTRACT

A fastening tool. In the fastening tool, a top part guiding matching portion engages a top part guiding portion in a sliding fit; a pressing part guiding matching portion engages a pressing part guiding portion in a sliding fit; a lever hinged to a base part; a transmission part engages a transmission part guiding slot in a sliding fit; the transmission part is driven to slide by the pressing part, and the lever is driven to rotate by the transmission part, then the top part is driven to slide out, due to a reaction force acting on the pressing part by the transmission part and the friction between the pressing part and the base part, the pressing part remains to be self-locked by friction, which can constrain the pressing part and the top part is locked.

19 Claims, 8 Drawing Sheets

(56) References Cited

FOREIGN PATENT DOCUMENTS

| | | | |
|---|---|---|---|
| CN | 106271570 | A | 1/2017 |
| CN | 106392713 | A | 2/2017 |
| CN | 209936281 | U | 1/2020 |
| CN | 111823001 | A | 10/2020 |
| EP | 3257622 | A1 | 12/2017 |

FASTENING TOOL, A BOLT ASSEMBLING DEVICE AND A METHOD FOR ASSEMBLING A HIGH PRESSURE COMPRESSOR ROTOR

TECHNICAL FIELD

The invention relates to the field of engine assembly, and in particular to a fastening tool, a bolt assembling device and a method for assembling a high pressure compressor rotor.

BACKGROUND

Figure 1:
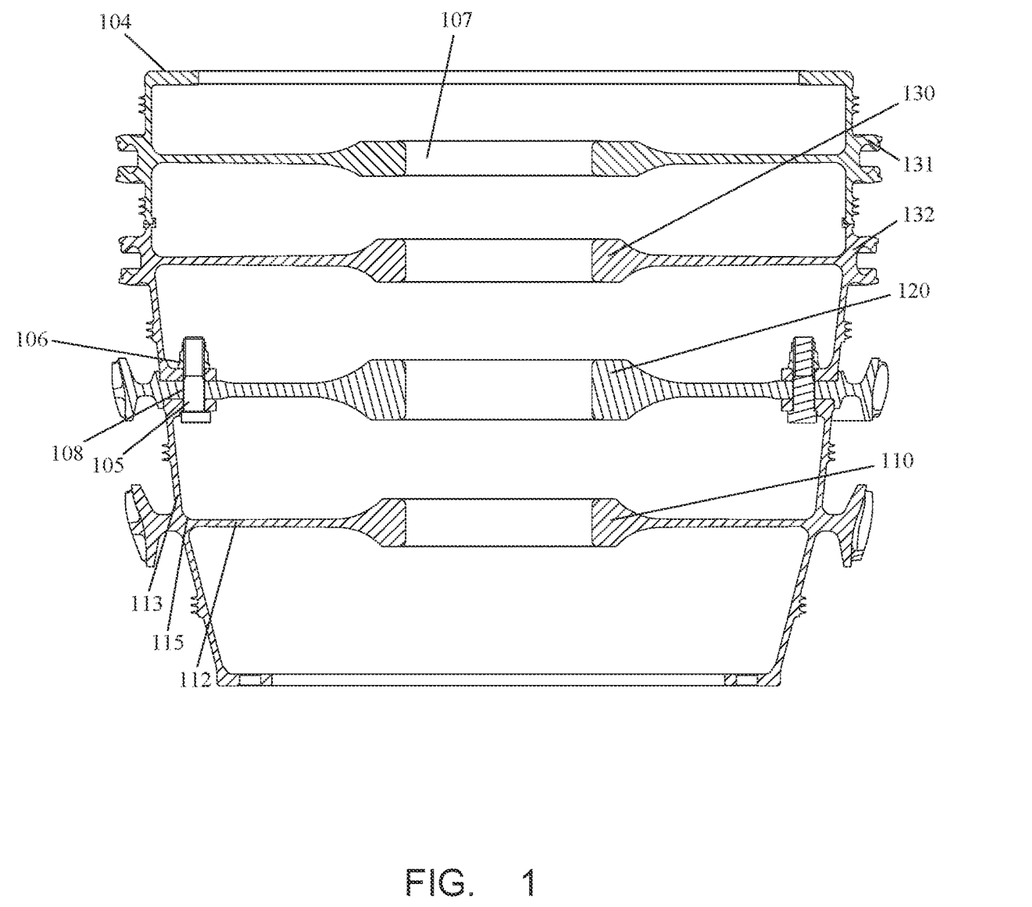
FIG. 1 is a schematic cross-sectional view of the multi-stage disks connection structure of the high pressure compressor rotor in prior art.

High pressure compressor rotor is an important component of an aero engine which comprises multi-stage disks connected by threaded fastener. As shown in FIG. 1, a high pressure compressor rotor 100 of an exemplary engine comprises a first disk 110, a second disk 120 and a third disk 130, wherein the third disk 130 comprises an upper disk 131 and a lower disk 132 welded together. The first disk 110, the second disk 120 and the third disk 130 are connected by a plurality of bolts 105 and nuts 106. The diameter of a center of disk 107 (a through hole at the center of the multi-stage disks) of the rotor is small, the distance between a mounting position of a bolt 105 and the center of disk 107 is large, the axial distance between adjacent disks is small, the axial distance between the mounting position of the bolt 105 and a rear face 104 of the multi-stage disks is large, and the multi-stage disks is in a shape of an inverted cone, an angle fillet is provided at where an inner wall of the disk and a wheel plate of the disk are connected, for example the angle fillet 115 is provided at where the wheel plate 112 and the inner wall 113 of the first disk 110 are connected, so there are irregular planes below the mounting position of the bolt 105, which is a typical narrow space with deep cavity in different planes.

In the traditional method for assembling the high pressure compressor rotor 100, the worker needs to place the bolt 105 into a mounting hole 108 from the center of disk 107, during the installation process the worker needs to fix the bolt 105 manually until the nut 106 is tightened. Due to the larger number of the bolts 105 and the mounting space being extremely small and invisible, it is difficult to assemble the bolts as the worker needs to reach the aforementioned narrow space with deep cavity in different planes, put the bolt 105 into the mounting hole 108 by feelings and keep the bolt 105 still for a long time by hand, which is extremely energy consuming and takes a long time to complete installation of a full circle of bolts 105, and the assembly efficiency is low.

SUMMARY

A purpose of the invention is to provide a fastening tool which is capable of self-lock, having a simple structure and easy to use.

The fastening tool to achieve the purpose comprises: a base part, provided with a top part guiding portion, pressing part guiding portion and a transmission part guiding slot; a top part, at least part of which is placed in the base part and provided with a top part guiding matching portion, wherein the top part guiding matching portion engages the top part guiding portion in a sliding fit; a pressing part, provided with an inclined transmission surface and a pressing part guiding matching portion, wherein the pressing part guiding matching portion engages the pressing part guiding portion in a sliding fit to guide the sliding of the pressing part; a lever, provided with a first end, a second end and a hinging portion between the first end and the second end, wherein the hinging portion is hinged to the base part; a transmission part, engaging the transmission part guiding slot in a sliding fit; wherein the transmission part is driven to slide by the inclined transmission surface of the pressing part when the pressing part is driven to slide towards a fastening direction, the lever is driven to rotate as a force is applied by the transmission part to the second end of the lever, then the top part is driven to slide outwards the base part as a force is applied by the first end of the lever to the top part, so as to push a workpiece upwards; due to a reaction force acting on the inclined transmission surface by the transmission part and the friction between the pressing part guiding matching portion and the pressing part guiding portion, the pressing part remains to be self-locked by friction, which can constrain the sliding fit between the pressing part guiding matching portion and the pressing part guiding portion, and the slided top part is locked.

In one or more embodiments of the fastening tool, the distance between the first end and the hinging portion is larger than the distance between the second end and the hinging portion.

In one or more embodiments of the fastening tool, the sliding fit between the top part guiding portion and the top part guiding matching portion has an end point to prevent the top part from detaching from the base part.

In one or more embodiments of the fastening tool, the base part comprises a top wall, the top wall is provided with a through top part sliding slot, wherein the top part sliding slot is regarded as the top part guiding portion.

In one or more embodiments of the fastening tool, the base part comprises two side walls, at least part of the top part is placed in the space between the two side walls, wherein the two side walls are provided with a guiding sliding slot or a guiding pin or a guiding convex portion as the top part guiding portion, and the top part is provided with a guiding pin or a guiding convex portion or a guiding sliding slot as the top part guiding matching portion correspondingly, or the outer surface of the top part is regarded as the top part guiding matching portion.

In one or more embodiments of the fastening tool, the base part comprises two side walls provided along a vertical direction, at least part of the top part is placed in the space between the two side walls, the lever is placed between the two side walls with the hinging portion hinged to the two side walls respectively;
  wherein the two side walls are provided with guiding sliding slots or guiding pins or guiding convex portions in the horizontal direction respectively, regarded as the pressing part guiding portion, and the pressing part is provided with a guiding pin or a guiding convex portion or a guiding sliding slot in the horizontal direction correspondingly, regarded as the pressing part guiding matching portion;
  the two side walls are provided with guiding sliding slots or guiding pins or guiding convex portions in the vertical direction respectively, regarded as the top part guiding portion, and the top part is provided with a guiding pin or a guiding convex portion or a guiding sliding slot in the vertical direction correspondingly, regarded as the top part guiding matching portion, or the outer surface of the top part is regarded as the top part guiding matching portion;
  the two side walls are provided with the transmission part guiding slots in the vertical direction respectively, the transmission part engages the transmission part guiding slots with a transmission pin;

the pressing part comprises a middle wall and two side arms provided on the two sides of the middle wall, the two side arms are provided with the inclined transmission surface respectively to engage with the transmission pin, the middle wall or/and the two side arms are provided with the pressing part guiding matching portion.

In one or more embodiments of the fastening tool, the transmission part comprises a transmission pin and a wheel provided on the transmission pin, wherein the transmission part engages the second end of the lever with the wheel.

In one or more embodiments of the fastening tool, the transmission part and the second end of the lever are provided as an integral structure, and the transmission part guiding slots is provided as an arc shaped slot with the hinging portion being the center of arc.

The fastening tool is capable of self-lock, which can remain at the state of pushing the bolt or other workpiece upwards without applying an external force continuously, so that the subsequent assembly or other operation on the bolt or other workpiece can be carried out. The fastening tool has a simple structure, which is easy to manufacture with a low cost and also easy to use.

Another purpose of the invention is to provide a bolt assembling device which is capable of self-lock and can be used for the assembly of bolts in a narrow space with deep cavity in different planes, improving the efficiency of assembly.

The bolt assembling device to achieve the purpose is used for the assembly of multi-stage disks of a high pressure compressor rotor, comprising a plurality of fastening tool mentioned above, wherein the fastening tool can be placed on a wheel plate of a disk which is below a mounting position of a bolt, and the bolt assembling device comprises an unlocking part connected to the pressing part, the pressing part can slide along a radial direction of the disk, the unlocking part extends from the mounting position of the bolt to a center of the disk.

In one or more embodiments of the bolt assembling device, the base part facing an inner wall of the disk is provided with a chamfered portion to avoid an angle fillet at wherein the inner wall of the disk and the wheel plate are connected.

In one or more embodiments of the bolt assembling device, the unlocking part is a soft wire or a chain.

The bolt assembling device is capable of self-lock, which can remain at the state of pushing the bolt or other workpiece upwards without applying an external force continuously, so that the threaded fastener can be mounted and the worker can have a free hand, improving the assembly efficiency. The bolt assembling device has a simple structure, which is easy to manufacture with a low cost and also easy to use, even when the bolt assembling device is placed at a position which is difficult to reach or has limited working space, for example the aforementioned narrow space with deep cavity in different planes, it is also easy to use, improving the assembly efficiency.

Another purpose of the invention is to provide a method for assembling a high pressure compressor rotor, which can be used for the assembly of bolts in a narrow space with deep cavity in different planes, improving the efficiency of assembly.

The method for assembling the high pressure compressor rotor to achieve the purpose comprises connecting multi-stage disks by bolts, firstly placing any one of the bolt assembling device mentioned above on the wheel plate of the disk which is below the mounting position of the bolt, pushing the bolts upwards respectively by the fastening tool, and stacking an adjacent disk on the disk below with the bolts being pushed upwards through screw holes on the adjacent disk.

The method for assembling the multi-stage disks of the high pressure compressor rotor is to pre-push the bolts on the disk below by the fastening tool and stack the adjacent disk on the disk below, so the bolts is visible during assembly. Compared with the traditional assembly method wherein the bolts are assembled after each stage of the disk is stacked, the worker does not need to assemble the bolts by feelings in the narrow space with deep cavity in different planes and keep the bolt still continuously by hand, which can reduce the difficulty of assembly and labour intensity of the worker, greatly improve the assembly efficiency of the bolts, and reduce the assembly cycle of the bolts and the cost.

BRIEF DESCRIPTION OF DRAWINGS

The above mentioned and other features, properties and advantages of the present invention would be more apparent by the accompanying drawings in combination with the description of embodiments as following, wherein.

DETAILED DESCRIPTION

A variety of different implementations or examples for implementing the technical solutions of the said subject are disclosed as below. To simplify the disclosure, specific examples of each element and arrangement are described as below. Of course, these are only examples and are not intended to limit the scope of protection of the present invention. For example, the first feature described later in the description is provided above the second feature, which may include an embodiment in which the first and second features are directly connected, or may include an embodiment in which an additional feature is provided between the first and second features so that the first and second features may not be directly connected. In addition, the reference numerals and/or letters may be repeated in different examples in the disclosure. The repetition is for brevity and clarity, and does not indicate the relationship between the various embodiments and/or structures to be described. Further, when the first element is described in the manner of being connected or combined with the second element, the description may include an embodiment in which the first and second elements are directly connected or combined with each other, and also may include an embodiment in which one or more other intervening elements is provided to between the first and second elements so that the first and second so that the first and second elements are not directly connected or combined with each other. In the description of the present invention, it should be noted that the terms "center", "vertical", "horizontal", "upper", "lower", "front", "rear", "left", "right", "The orientation or positional relationship indicated by "vertical", "horizontal", "top", "bottom", "inner", "outer", etc. are based on the orientation or positional relationship shown in the drawings, only for the convenience of describing these embodiments and the simplification of the description, rather than indicating or implying that the device or element referred to must have a specific orientation, be constructed and operated in a specific orientation. In addition, the terms "first", "second", etc. are only used for descriptive purposes, and should not be understood as indicating or implying relative importance or implicitly indicating the number of indicated technical features. Thus, the features defined with "first", "second", etc. may explicitly or implicitly include one or more of these features. It should be understood that the drawings are only for examples, and are not drawn on the condition of equal proportions, and should not be used to limit the scope of protection actually covered by the present invention. In addition, the conversion modes in different implementations can be appropriately combined.

Figure 2:
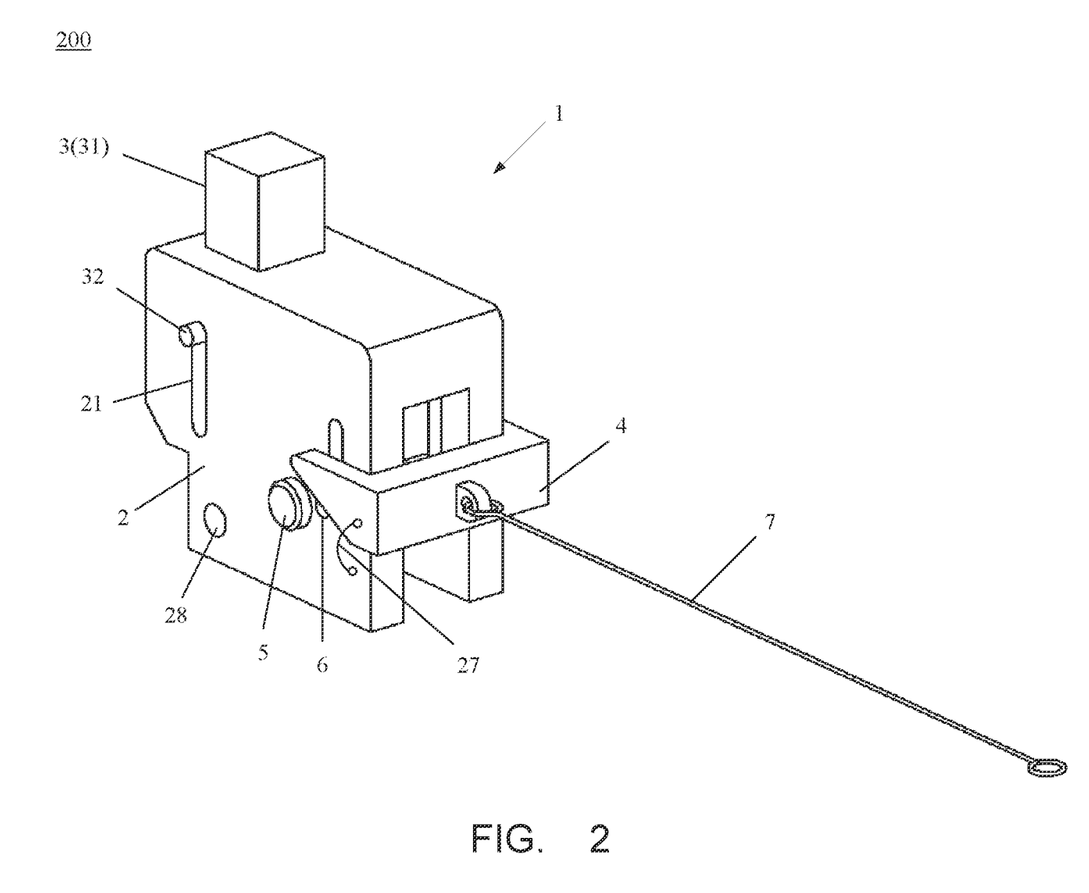
FIG. 2 is a schematic stereogram of the bolt assembling device according to one or more embodiments.
Figure 3:
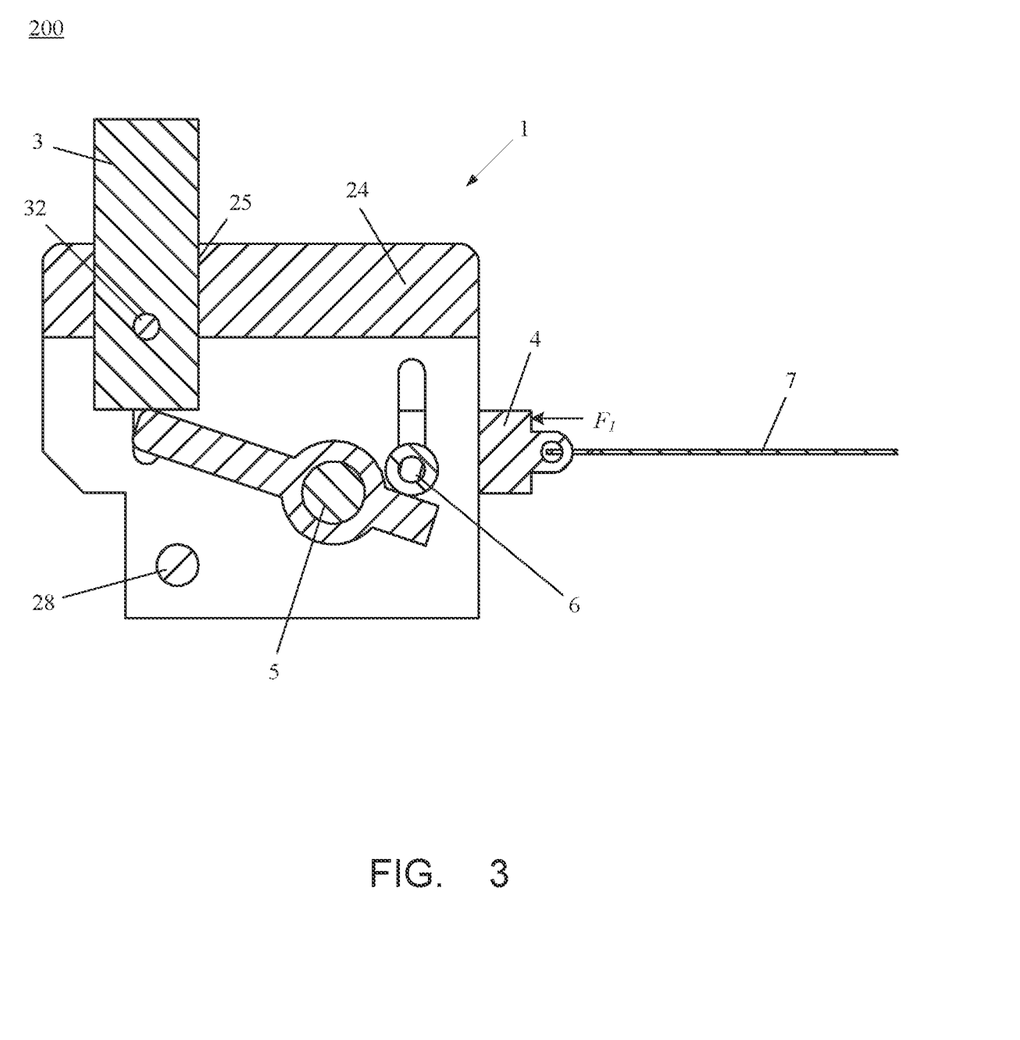
FIG. 3 is a schematic cross-sectional view of the bolt assembling device according to one or more embodiments.
Figure 4:
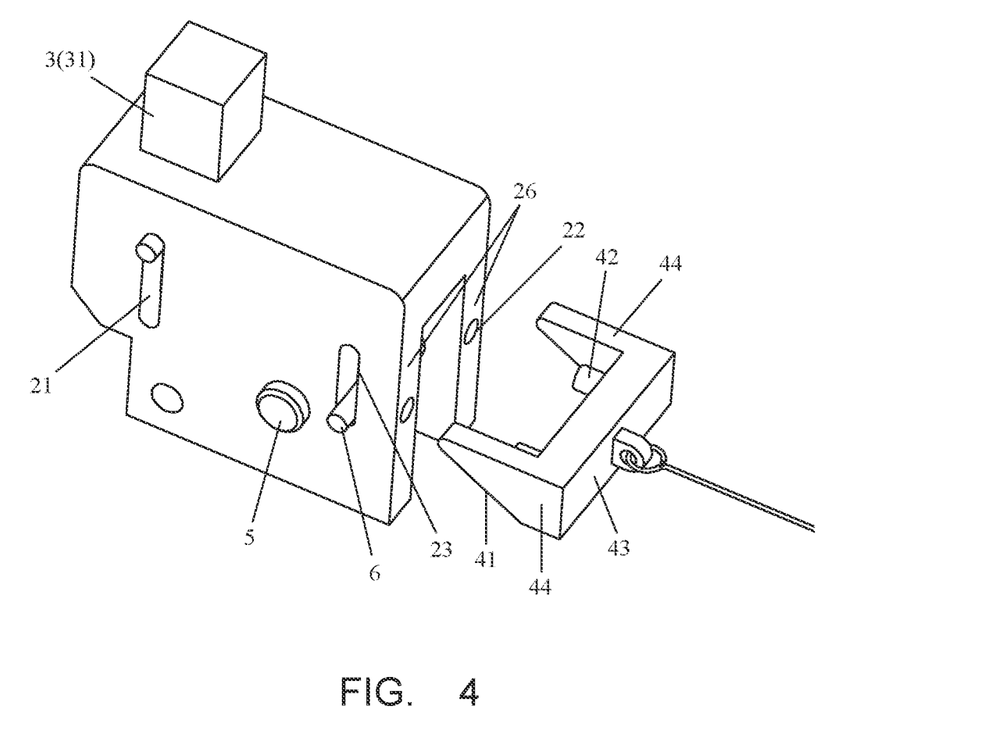
FIG. 4 is a schematic diagram of the bolt assembling device which is partially exploded according to one or more embodiments.

A fastening tool 1 according to the present invention is shown by FIG. 2 to FIG. 4, comprising a base part 2, a top part 3, a pressing part 4, a lever 5 and a transmission part 6.

The base part is provided with a top part guiding portion, a pressing part guiding portion 22 and a transmission part guiding slot 23. At least part of the top part 3 is placed in the base part 2, provided with a top part guiding matching portion, the top part guiding matching portion engages the top part guiding portion in a sliding fit, which will be described later in detail. The pressing part 4 is provided with an inclined transmission surface 41 and a pressing part guiding matching portion 42, the pressing part guiding matching portion 42 engages the pressing part guiding portion 22 in a sliding fit, to guide the sliding of the pressing part 4. The lever 5 is provided with a first end 51, a second end 52 and a hinging portion 53 between the first end 51 and the second end 52, the hinging portion 53 is hinged to the base part 2. The transmission part 6 engages the transmission part guiding slot 23 in a sliding fit.

When the pressing part 4 is driven by an external force F1 to slide towards a fastening direction (the direction from the RHS to the LHS in the embodiment shown in FIG. 3), the transmission part 6 is driven to slide by the inclined transmission surface 41 of the pressing part 4, then the lever 5 is driven to rotate as a force is applied by the transmission part 6 to the second end 52 of the lever 5, then the top part 3 is driven to slide outwards the base part 2 as a force is applied by the first end 51 of the lever 5 to the top part 3, so that the top part 3 can push the bolt of other workpieces upwards.

When the external force F1 is removed, due to a reaction force acting on the inclined transmission surface 41 by the transmission part 6 and the friction between the pressing part guiding matching portion 42 and the pressing part guiding portion 22, the pressing part 4 remains to be self-locked by friction, which can constrain the sliding fit between the pressing part guiding matching portion 42 and the pressing part guiding portion 22, and the slided top part 3 is locked.

Figure 5:
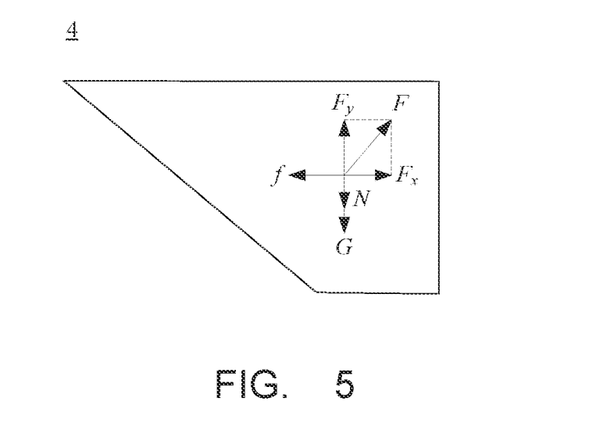
FIG. 5 is free body diagram of the pressing part according to the embodiment shown in FIG. 3.
Figure 6:
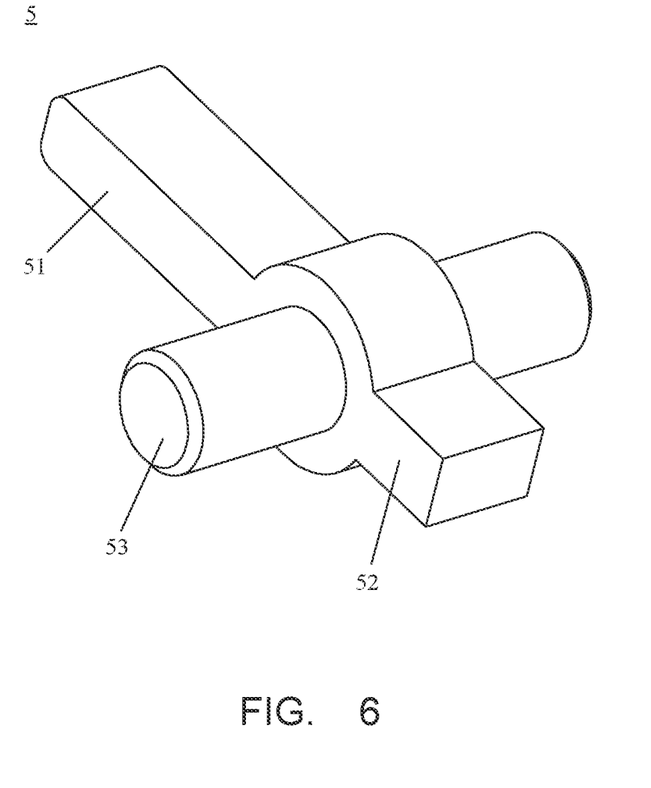
FIG. 6 is a schematic diagram of the structure of the lever according to one or more embodiments.

In the embodiment shown by FIG. 3, the force diagram of the pressing part 4 when the external force F1 is removed is shown in FIG. 5. The active forces acting on the pressing part 4 are gravity force G, the reaction force F acting on the inclined transmission surface 41 by the transmission part 6, the passive force acting on the pressing part 4 are a normal force N exerted on the pressing part guiding matching portion 42 by the pressing part guiding portion 22 and the friction f, the maximum static friction between the pressing part guiding portion 22 and the pressing part guiding matching portion 42 is $f_{max}$. The magnitude of the reaction force F relates to the gravity force of the top part 3, the reaction force acting on the top part 3 by the workpiece being pushed upwards, the distance between the hinging portion 53 of the lever 5 and the top part 3 and the distance between the hinging portion 53 and the transmission part 6 (which are the moment arms of the lever 5). The structure and the weight of the top part 3, the pressing part 4 and the lever 5 are designed so that the vertical component $F_y$ of the reaction force F is $F_y > G$, the direction of the normal force N is the same as the direction of gravity force G and the magnitude of the normal force N increases with the increase of the reaction force F, so the maximum static friction $f_{max}$ also increases with the increase of the reaction force F. The inclined transmission surface 41 can be an inclined flat surface or a curved surface. If the inclined transmission surface 41 is a flat surface, the reaction force F acting on the inclined transmission surface 41 by the transmission part 6 is perpendicular to the inclined transmission surface 41. If the inclined transmission surface 41 is a curved surface, the reaction force F is perpendicular to the tangent plane of the point where the inclined transmission surface 41 touches the transmission part 6 (not shown on the diagram). The tangent of the aforementioned flat surface or tangent plane is designed so that the component force $F_x$ of the active forces acting on the pressing part 4, which is a resultant force of the gravity force G and the reaction force F, in the direction of sliding of the pressing part 4 (which is the horizontal direction in the embodiment shown in FIG. 3) is $F_x = f \leq f_{max}$, so the pressing part 4 remains to be self-locked by friction, which can constrain the sliding fit between the pressing part guiding matching portion 42 and the pressing part guiding portion 22, and the slided top part 3 is locked.

The fastening tool 1 is capable of self-lock, which can remain at the state of pushing the bolt or other workpiece upwards without applying an external force continuously, so that the subsequent assembly or other operation on the bolt or other workpiece can be carried out. After use, the pressing part 4 is pulled towards the direction which is opposite to the fastening direction, the top part 3 can be retracted into the base part 2, so that the height of the fastening tool 1 is reduced, the fastening tool 1 no longer pushes the bolt or other workpiece upwards and can be removed. The fastening tool 1 has a simple structure, which is easy to manufacture with a low cost and also easy to use.

Referring to FIG. 3 to FIG. 6, as the distance between the first end 51 and the hinging portion 53 of the lever 5 is larger than the distance between the second end 52 and the hinging portion 53, the displacement of the pressing part 4 can be enlarged, which means a relatively small displacement of the pressing part 4 would result in a relatively large displacement of the top part 3, so that the structure of the fastening tool 1 can be more compact and space saving.

Referring to FIG. 2 to FIG. 4, the base part 2 comprises a top wall 24, the top wall 24 is provided with a through top part sliding slot 25, wherein the top part sliding slot 25 can be regarded as the aforementioned top part guiding portion, and the outer surface 31 of the top part 3 can be regarded as the aforementioned top part guiding matching portion correspondingly which engages the top part sliding slot 25 in a sliding fit, so the structure can be further simplified and easier to manufacture.

In some embodiments, a guiding pin or a guiding convex portion (not shown in Figures) is provided on the top part 3, regarded as the top part guiding matching portion which engages the top part sliding slot 25 in a sliding fit.

Continuing to refer to FIG. 2 to FIG. 4, the top part guiding portion can also be provided on two side walls 26 of the base part 2, at least part of the top part 3 is placed in the space between the two side walls 26, wherein the two side walls 26 are provided with a guiding sliding slot 21 as the top part guiding portion respectively, and the top part 3 is provided with a guiding pin 32 as the top part guiding matching portion correspondingly which engages the guiding sliding slot 21 in a sliding fit, so the structure can be further simplified and easier to manufacture.

In some embodiments, a guiding convex portion (not shown in Figures) is provided on the top part 3, regarded as the top part guiding matching portion which engages the guiding sliding slot 21 in a sliding fit, or the outer surface 31 of the top part 3 is regarded as the top part guiding matching portion.

In some embodiments, guiding pins or guiding convex portions (not shown in Figures) are provided on the two side walls 26, regarded as the top part guiding portion, and a guiding sliding slot (not shown in Figures) is provided on the top part 3 correspondingly, regarded as the top part guiding matching portion.

The sliding fit between the top part guiding portion and the top part guiding matching portion has an end point to prevent the top part 3 from detaching from the base part 2. The examples of the end point include but are not limited to a limiting convex portion, a limiting plate, a limiting pin, an end point of the guiding sliding slot or an end point of the transmission part guiding slot 23 etc. provided on the top part 3 or the base part 2.

Continuing to refer to FIG. 2 to FIG. 4, the two side walls 26 are provided along the vertical direction, the lever 5 is placed between the two side walls 26 with the hinging portion 53 hinged to the two side walls 26 respectively. The two side walls 26 are provided with guiding sliding slots or guiding pins or guiding convex portions in the horizontal direction respectively, regarded as the pressing part guiding portion 22, and the pressing part 4 is provided with a guiding pin or a guiding convex portion or a guiding sliding slot in the horizontal direction correspondingly, regarded as the pressing part guiding matching portion 42. The two side walls 26 are provided with guiding sliding slots or guiding pins or guiding convex portions in the vertical direction respectively, regarded as the top part guiding portion, and the top part 3 is provided with a guiding pin or a guiding convex portion or a guiding sliding slot in the vertical direction correspondingly, regarded as the top part guiding matching portion, or the outer surface of the top part 3 is regarded as the top part guiding matching portion. The two side walls 26 are provided with the transmission part guiding slots 23 in the vertical direction respectively, the transmission part 6 engages the transmission part guiding slots 23 on the two side walls 26 with a transmission pin 61. The pressing part 4 comprises a middle wall 43 and two side arms 44 provided on the two sides of the middle wall 43. The two side arms 44 are provided with the inclined transmission surface 41 respectively to engage with the transmission pin 61. The middle wall 43 or/and the two side arms 44 are provided with the pressing part guiding matching portion 42, so the structure of the fastening tool 1 can be more compact, more simplified and easier to manufacture.

Figure 7:
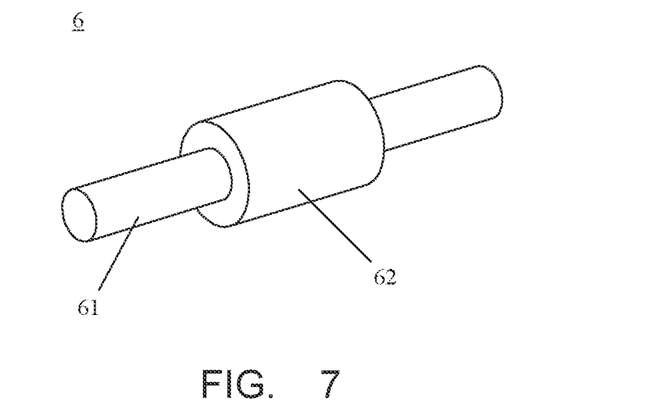
FIG. 7 is a schematic diagram of the structure of the transmission part according to one or more embodiments.

Referring to FIG. 3 and FIG. 7, the transmission part 6 comprises the transmission pin 61 and a wheel 62 provided on the transmission pin 61, the transmission part 6 engages the second end 52 of the lever 5 with the wheel 62, so as to ensure a good contact between the transmission part 6 and the lever 5, and the structure can be further simplified and easy to manufacture.

The transmission part 6 and the second end 52 of the lever 5 can also be provided as an integral structure, and the transmission part guiding slots 23 is provided as an arc shaped slot with the hinging portion 53 being the center of arc correspondingly, so the structure can be further simplified and easy to manufacture.

Referring to FIG. 2, the pressing part 4 is connected to the base part 2 by a connecting part 27 to enable easy storage of the fastening tool 1, preventing the loss of the pressing part 4. The examples of the connecting part 27 include but are not limited to a wire rope or a chain.

Referring to FIG. 2 and FIG. 3, the base part 2 comprising a stop pin 28 to limit the range of motion of the lever 5, preventing the lever 5 from moving outside of the base part 2 to cause damage, so the structure of the fastening tool 1 is compact and easy for storage. Moreover, the range of motion of the top part 3 is also limited by the lever 5 indirectly, preventing the top part 3 from detaching from the base part 2. The range of motion of the lever 5 and the top part 3 can also be limited by the end point of the transmission part guiding slots 23, without providing the stop pin 28.

A bolt assembling device 200 according to the present invention is shown by FIG. 2 to FIG. 4, comprising the fastening tool 1 and an unlocking part 7, the unlocking part 7 is connected to the pressing part 4 of the fastening tool 1 for unlocking and removing the bolt assembling device 200, which is especially suitable when the bolt assembling device 200 is placed at a position which is difficult to reach or has limited working space, for example when the bolt assembling device 200 is placed in the aforementioned narrow space with deep cavity in different planes, the unlocking part 7 can be used for unlocking and removing the bolt assembling device 200. The examples of the unlocking part 7 include but are not limited to a soft wire or a chain.

The bolt assembling device 200 is capable of self-lock, which can remain at the state of pushing the bolt or other workpiece upwards without applying an external force continuously, so that the threaded fastener can be mounted and the worker can have a free hand, improving the assembly efficiency. The bolt assembling device 200 has a simple structure, which is easy to manufacture with a low cost and also easy to use, even when the bolt assembling device 200 is placed at the position which is difficult to reach or has limited working space, for example the aforementioned narrow space with deep cavity in different planes, it is also easy to use, improving the assembly efficiency.

Figure 8:
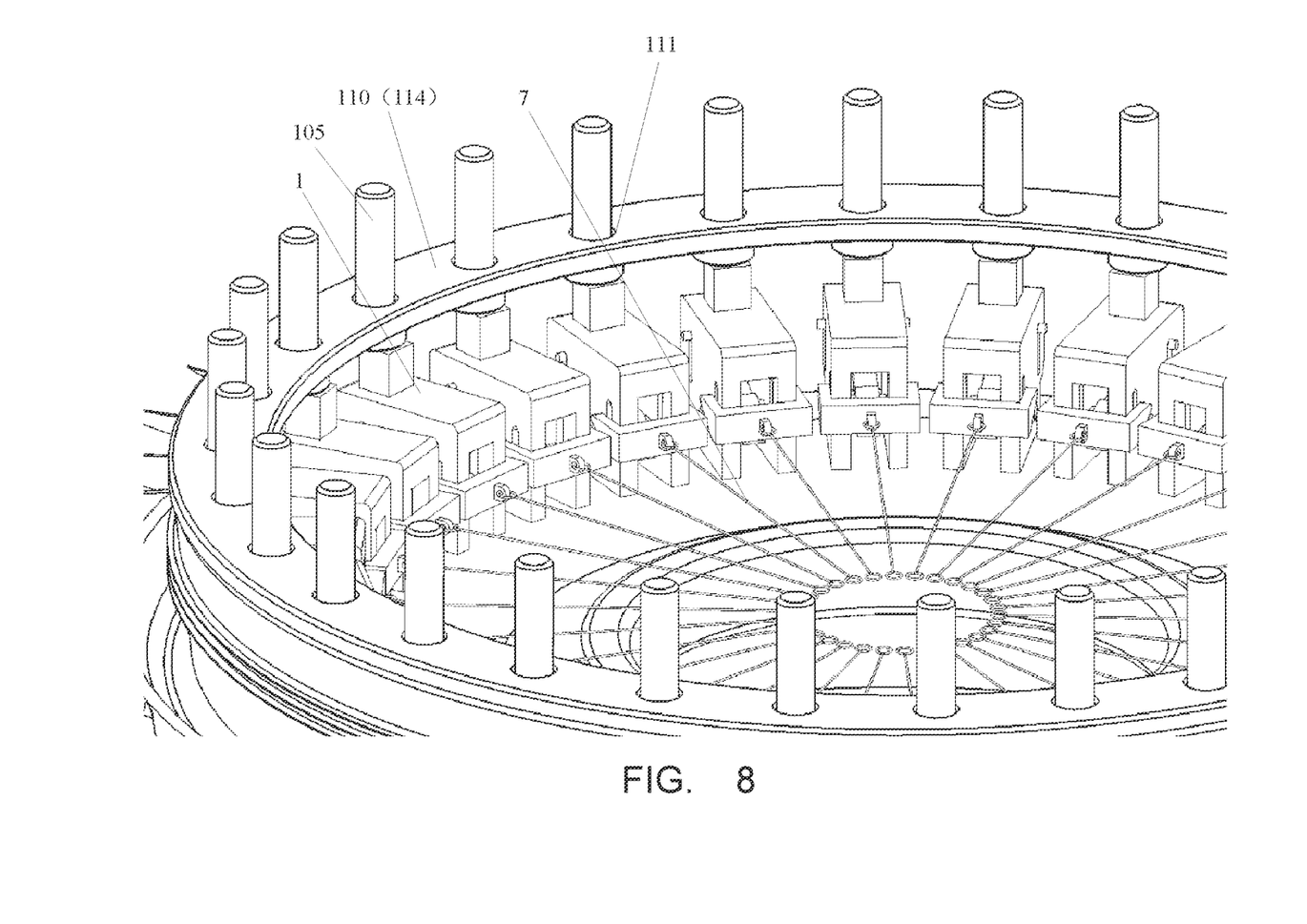
FIG. 8 is a partial schematic stereogram of the bolt assembling device when the bolt is pushed according to one or more embodiments.
Figure 9:
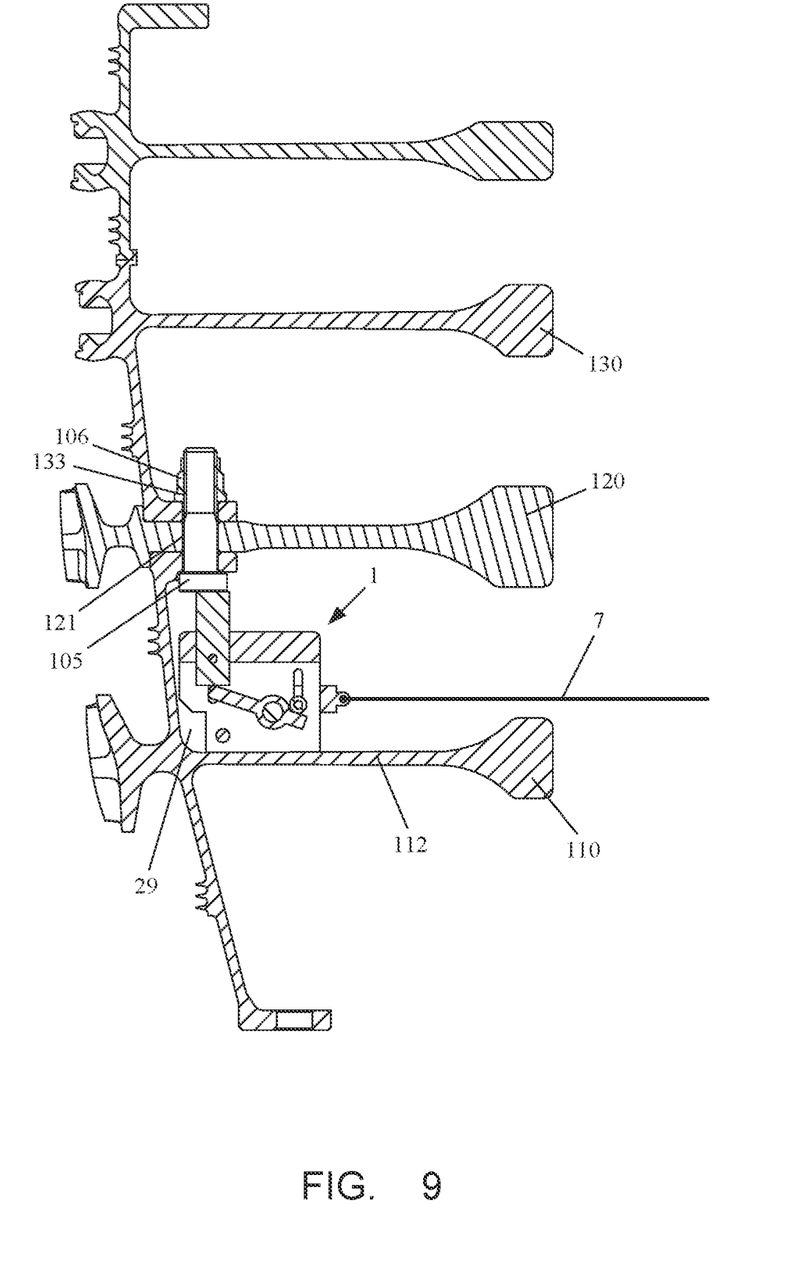
FIG. 9 is a partial schematic cross-sectional view of the bolt assembling device with half of the disk hided when the bolt is pushed according to one or more embodiments.
Figure 10:
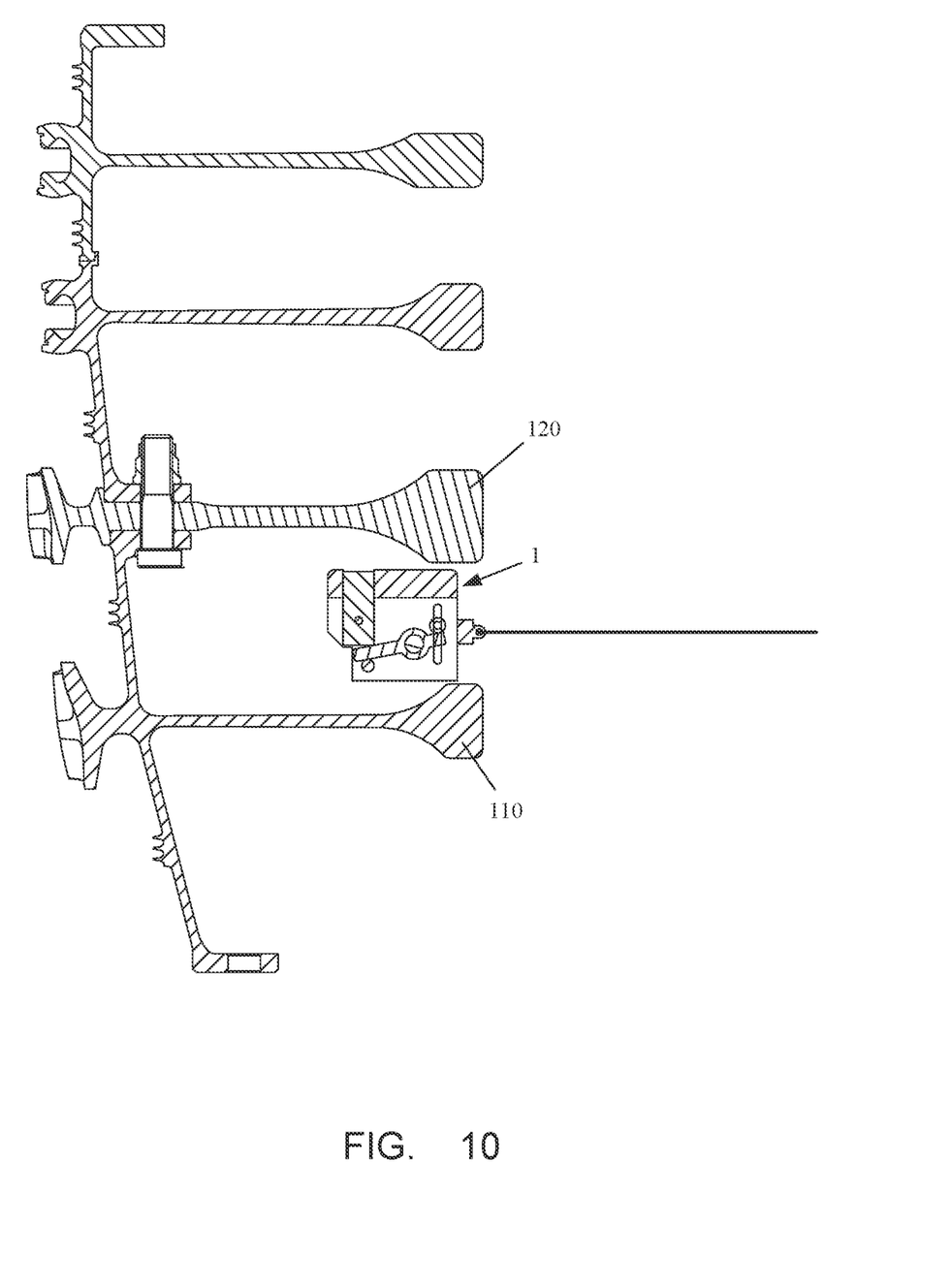
FIG. 10 is a partial schematic cross-sectional view of the bolt assembling device with half of the disk hided when the bolt assembling device is unlocked and removed according to one or more embodiments.

Referring to FIG. 8 to FIG. 10, the bolt assembling device 200 can be used for the assembly of multi-stage disks of a high pressure compressor rotor 100. The fastening tool 1 can be placed on a wheel plate 112 of a first disk 110 which is below a mounting position of a bolt 105, the pressing part 4 can slide along a radial direction of the first disk 110, wherein the radial direction refers to the radial direction and the direction slightly offset from the radial direction, the unlocking part 7 extends from the mounting position of the bolt 105 to a center of disk 107. The base part 2 of the fastening tool 1 facing an inner wall 113 of the first disk 110 is provided with a chamfered portion 29 to avoid an angle fillet 115 at where the inner wall 113 of the first disk 110 and the wheel plate 112 are connected.

A method for assembling the multi-stage disks of the high pressure compressor rotor 100 using the bolt assembling device 200 comprises the following steps (referring to FIG. 8 to FIG. 10):

1. put the bolt 105 through a first mounting hole 111 on the first disk 110;
2. place the bolt assembling device 200 on the wheel plate 112 of the first disk 110 which is below the mounting position of the bolt 105, and place the pressing part 4 at the inner sider of the first disk 110 in the radial direction;
3. push the pressing part 4 to slide towards to outer side of the first disk 110 in the radial direction, and the lever 5 is driven to rotate by the transmission part 6 so that the top part 3 slides out to push the bolt 105 upon a flange 114 of the first disk 110 and the unlocking part 7 extends from the mounting position of the bolt 105 to the center of disk 107 (the position of the center of disk 107 is shown in FIG. 1);
4. repeat step 1 to step 3 so that the rest bolts 105 are also pushed upwards by the fastening tool 1 and each unlocking part 7 extends from the mounting position of the corresponding bolt 105 to the center of disk 107, the completed state is shown in FIG. 8;
5. align each second mounting hole 121 of a second disk 120 with the bolts 105 so that each bolt 105 is placed in the corresponding second mounting hole 121 and the second disk 120 is placed on the first disk 110;
6. align each third mounting hole 133 of a third disk 130 with the bolts 105 so that each bolt 105 is placed in the corresponding third mounting hole 133 and the third disk 130 is placed on the second disk 120;
7. tighten a plurality of nuts 106 on the corresponding bolts 105;
8. pull the unlocking part 7 at the center of disk 107 so that the pressing part 4 moves towards the inner sider of the first disk 110 in the radial direction, the top part 3 falls down due to gravity and the height of the fastening tool 1 is reduced, so the fastening tool 1 can be pulled back to the center of disk 107 by the unlocking part 7 and removed, as shown in FIG. 10.

The method for assembling the multi-stage disks of the high pressure compressor rotor 100 is to pre-push the bolts 105 on the flange 114 of the first disk 110 by the fastening tool 1 and stack the second disk 120 and the third disk 130 on the first disk 110, so the bolts 105 is visible during assembly. Compared with the traditional assembly method wherein the bolts 105 are assembled after each stage of the disk is stacked, the worker does not need to assemble the bolts by feelings in the narrow space with deep cavity in different planes and keep the bolt 105 still continuously by hand, which can reduce the difficulty of assembly and labour intensity of the worker, greatly improve the assembly efficiency of the bolts 105, and reduce the assembly cycle of the bolts 105 and the cost.

Although the present invention is disclosed by the preferred embodiments described above, they are not intended to limit the present invention. Any person skilled in the art can make possible changes and modifications without departing from the spirit and scope of the present invention. Therefore, all modifications, equivalent changes and modifications made to the above embodiments based on the technical essence of the present invention without departing from the technical solutions of the present invention fall within the protection scope defined by the claims of the present invention.

The invention claimed is:

1. A fastening tool characterized in comprising:
   a base part, provided with a top part guiding portion, a pressing part guiding portion and a transmission part guiding slot;
   a top part, at least part of which is placed in the base part and provided with a top part guiding matching portion, wherein the top part guiding matching portion engages the top part guiding portion in a sliding fit;
   a pressing part, provided with an inclined transmission surface and a pressing part guiding matching portion, wherein the pressing part guiding matching portion engages the pressing part guiding portion in a sliding fit to guide the sliding of the pressing part;
   a lever, provided with a first end, a second end and a hinging portion between the first end and the second end, wherein the hinging portion is hinged to the base part;
   a transmission part, engaging the transmission part guiding slot in a sliding fit;
   wherein the transmission part is driven to slide by the inclined transmission surface of the pressing part when the pressing part is driven to slide towards a fastening direction, the lever is driven to rotate as a force is applied by the transmission part to the second end of the lever, then the top part is driven to slide outwards the base part as a force is applied by the first end of the lever to the top part, so as to push a workpiece upwards; due to a reaction force acting on the inclined transmission surface by the transmission part and a friction between the pressing part guiding matching portion and the pressing part guiding portion, the pressing part remains to be self-locked by friction, which can constrain the sliding fit between the pressing part guiding matching portion and the pressing part guiding portion, and the slided top part is locked.

2. The fastening tool according to claim 1, wherein the distance between the first end and the hinging portion is larger than the distance between the second end and the hinging portion.

3. The fastening tool according to claim 1, wherein the sliding fit between the top part guiding portion and the top part guiding matching portion has an end point to prevent the top part from detaching from the base part.

4. The fastening tool according to claim 1, wherein the base part comprises a top wall, the top wall is provided with a through top part sliding slot, wherein the top part sliding slot is regarded as the top part guiding portion.

5. The fastening tool according to claim 1, wherein the base part comprises two side walls, at least part of the top part is placed in the space between the two side walls, wherein the two side walls are provided with a guiding sliding slot or a guiding pin or a guiding convex portion as the top part guiding portion, and the top part is provided with a guiding pin or a guiding convex portion or a guiding sliding slot as the top part guiding matching portion correspondingly, or the outer surface of the top part is regarded as the top part guiding matching portion.

6. The fastening tool according to claim 1, wherein the base part comprises two side walls provided along a vertical direction, at least part of the top part is placed in the space between the two side walls, the lever is placed between the two side walls with the hinging portion hinged to the two side walls respectively;
- wherein the two side walls are provided with guiding sliding slots or guiding pins or guiding convex portions in the horizontal direction respectively, regarded as the pressing part guiding portion, and the pressing part is provided with a guiding pin or a guiding convex portion or a guiding sliding slot in the horizontal direction correspondingly, regarded as the pressing part guiding matching portion;
- the two side walls are provided with guiding sliding slots or guiding pins or guiding convex portions in the vertical direction respectively, regarded as the top part guiding portion, and the top part is provided with a guiding pin or a guiding convex portion or a guiding sliding slot in the vertical direction correspondingly, regarded as the top part guiding matching portion, or the outer surface of the top part is regarded as the top part guiding matching portion;
- the two side walls are provided with the transmission part guiding slots in the vertical direction respectively, the transmission part engages the transmission part guiding slots with a transmission pin;
- the pressing part comprises a middle wall and two side arms provided on the two sides of the middle wall, the two side arms are provided with the inclined transmission surface respectively to engage with the transmission pin, the middle wall or/and the two side arms are provided with the pressing part guiding matching portion.

7. The fastening tool according to claim 1, wherein the transmission part comprises a transmission pin and a wheel provided on the transmission pin, wherein the transmission part engages the second end of the lever with the wheel.

8. The fastening tool according to claim 1, wherein the transmission part and the second end of the lever are provided as an integral structure, and the transmission part guiding slots is provided as an arc shaped slot with the hinging portion being the center of arc.

9. A bolt assembling device, used for the assembly of multi-stage disks of a high pressure compressor rotor, characterized in comprising a plurality of fastening tool according to claim 1, wherein the fastening tool can be placed on a wheel plate of a disk which is below a mounting position of a bolt, and the bolt assembling device comprises an unlocking part connected to the pressing part, the pressing part can slide along a radial direction of the disk, the unlocking part extends from the mounting position of the bolt to a center of the disk.

10. The bolt assembling device according to claim 9, wherein the base part facing an inner wall of the disk is provided with a chamfered portion to avoid an angle fillet at where the inner wall of the disk and the wheel plate are connected.

11. The bolt assembling device according to claim 9, wherein the unlocking part is a soft wire or a chain.

12. The bolt assembling device according to claim 9, wherein the distance between the first end and the hinging portion is larger than the distance between the second end and the hinging portion.

13. The bolt assembling device according to claim 9, wherein the sliding fit between the top part guiding portion and the top part guiding matching portion has an end point to prevent the top part from detaching from the base part.

14. The bolt assembling device according to claim 9, wherein the base part comprises a top wall, the top wall is provided with a through top part sliding slot, wherein the top part sliding slot is regarded as the top part guiding portion.

15. The bolt assembling device according to claim 9, wherein the base part comprises two side walls, at least part of the top part is placed in the space between the two side walls, wherein the two side walls are provided with a guiding sliding slot or a guiding pin or a guiding convex portion as the top part guiding portion, and the top part is provided with a guiding pin or a guiding convex portion or a guiding sliding slot as the top part guiding matching portion correspondingly, or the outer surface of the top part is regarded as the top part guiding matching portion.

16. The bolt assembling device according to claim 9, wherein the base part comprises two side walls provided along a vertical direction, at least part of the top part is placed in the space between the two side walls, the lever is placed between the two side walls with the hinging portion hinged to the two side walls respectively;
- wherein the two side walls are provided with guiding sliding slots or guiding pins or guiding convex portions in the horizontal direction respectively, regarded as the pressing part guiding portion, and the pressing part is provided with a guiding pin or a guiding convex portion or a guiding sliding slot in the horizontal direction correspondingly, regarded as the pressing part guiding matching portion;
- the two side walls are provided with guiding sliding slots or guiding pins or guiding convex portions in the vertical direction respectively, regarded as the top part guiding portion, and the top part is provided with a guiding pin or a guiding convex portion or a guiding sliding slot in the vertical direction correspondingly, regarded as the top part guiding matching portion, or the outer surface of the top part is regarded as the top part guiding matching portion;
- the two side walls are provided with the transmission part guiding slots in the vertical direction respectively, the transmission part engages the transmission part guiding slots with a transmission pin;
- the pressing part comprises a middle wall and two side arms provided on the two sides of the middle wall, the two side arms are provided with the inclined transmission surface respectively to engage with the transmission pin, the middle wall or/and the two side arms are provided with the pressing part guiding matching portion.

17. The bolt assembling device according to claim 9, wherein the transmission part comprises a transmission pin and a wheel provided on the transmission pin, wherein the transmission part engages the second end of the lever with the wheel.

18. The bolt assembling device according to claim 9, wherein the transmission part and the second end of the lever are provided as an integral structure, and the transmission part guiding slots is provided as an arc shaped slot with the hinging portion being the center of arc.

19. A method for assembling a high pressure compressor rotor, comprising connecting multi-stage disks by bolts, characterized in firstly placing the bolt assembling device according to claim 9 on the wheel plate of the disk which is below the mounting position of the bolt, pushing the bolts upwards respectively by the fastening tool, and stacking an adjacent disk on the disk below with the bolts being pushed upwards through screw holes on the adjacent disk.

* * * * *